(12) United States Patent
Ikeda et al.

(10) Patent No.: US 8,842,408 B2
(45) Date of Patent: Sep. 23, 2014

(54) POWER SUPPLY CIRCUIT

(75) Inventors: Tomohiro Ikeda, Makinohara (JP);
Hirotaka Hasegawa, Makinohara (JP)

(73) Assignee: Yazaki Corporation, Tokyo (JP)

( * ) Notice: Subject to any disclaimer, the term of this patent is extended or adjusted under 35 U.S.C. 154(b) by 185 days.

(21) Appl. No.: 13/141,728

(22) PCT Filed: Oct. 26, 2010

(86) PCT No.: PCT/JP2010/069005
§ 371 (c)(1),
(2), (4) Date: Jun. 23, 2011

(87) PCT Pub. No.: WO2011/052609
PCT Pub. Date: May 5, 2011

(65) Prior Publication Data
US 2011/0261498 A1    Oct. 27, 2011

(30) Foreign Application Priority Data
Oct. 26, 2009   (JP) .................. 2009-245353

(51) Int. Cl.
| | |
|---|---|
| H01H 9/00 | (2006.01) |
| H01H 47/00 | (2006.01) |
| H01H 51/22 | (2006.01) |
| H01H 51/30 | (2006.01) |
| B60L 11/18 | (2006.01) |
| B60L 3/00 | (2006.01) |

(52) U.S. Cl.
CPC . B60L 11/18 (2013.01); B60L 3/00 (2013.01); *Y02T 10/7005* (2013.01)
USPC ...................................... 361/160

(58) Field of Classification Search
USPC .......... 361/160, 192, 193, 170, 172; 307/10.7
See application file for complete search history.

(56) References Cited

U.S. PATENT DOCUMENTS 7,557,460 B2 * 7/2009 Yugou .................... 307/10.7
2005/0098419 A1 * 5/2005 Matsui et al. ............ 200/311
(Continued)

FOREIGN PATENT DOCUMENTS

| CN | 1949658 A | 4/2007 |
| JP | 03-148389 A | 6/1991 |

(Continued)

OTHER PUBLICATIONS

Communication from the Japanese Patent Office dated Aug. 6, 2013, in a counterpart Japanese application No. 2009-245353.

(Continued)

*Primary Examiner* — Rexford Barnie
*Assistant Examiner* — Christopher Clark
(74) *Attorney, Agent, or Firm* — Sughrue Mion, PLLC

(57) ABSTRACT

There is provided a power supply circuit, in which cost reduction is realized by reducing the number of electric wires. An inverter 3 and a motor 4 are supplied with power by a high-voltage battery 21. Relays 22a to 22c are provided between the high-voltage battery 21 and the inverter 3. Both ends of each of relay coils C provided to the relays 22a to 22c are connected to an ECU 5, and the ECU 5 controls a current flowing through the relay coils C and thereby controls the turning on and off of the relays 22a to 22c. A service plug 6 is detachably provided between batteries making up the high-voltage battery 21, and when the service plug 6 is detached, the supply of power from the high-voltage battery 21 to the inverter 3 and the motor 4 is blocked and when the service plug 6 is attached, the supply of power from the high-voltage battery 21 to the inverter 3 and the motor 4 is enabled. An interlock switch 7 is turned off when the service plug 6 is detached, is turned on when the service plug 6 is attached, and is connected between the ECU 5 and the relay coils C.

2 Claims, 2 Drawing Sheets

(56) References Cited

U.S. PATENT DOCUMENTS

| | | | | |
|---|---|---|---|---|
| 2007/0080007 A1* | 4/2007 | Teramoto et al. | ............ | 180/65.3 |
| 2011/0024255 A1* | 2/2011 | Gomm et al. | ................ | 192/84.1 |

FOREIGN PATENT DOCUMENTS

| JP | 2000-175305 A | 6/2000 |
|---|---|---|
| JP | 2005-142107 A | 6/2005 |
| JP | 2006-136097 A | 5/2006 |
| JP | 2006-327251 A | 12/2006 |
| JP | 2006-337692 A | 12/2006 |
| JP | 2008-312396 A | 12/2008 |

OTHER PUBLICATIONS

Notification of Reasons for Refusal, dated for Dec. 17, 2013, issued by the Japanese Patent Office in counterpart Japanese Application No. 2009-245353.

Office Action, dated Apr. 7, 2013, issued by the State Intellectual Patent Office of the People's Republic of China in counterpart Chinese Application No. 201080003891.6.

Office Action dated May 13, 2014 issued by the Japanese Patent Office in counterpart Japanese Patent Application No. 2009-245353.

\* cited by examiner

POWER SUPPLY CIRCUIT

TECHNICAL FIELD

The present invention relates to a power supply circuit, for example, a power supply circuit including a blocking member that is detachably provided on a power supply path from a battery to a load.

BACKGROUND ART

In recent years, hybrid cars driven by using both an engine and an electric motor have become widespread. In such a hybrid car, a high-voltage battery whose voltage is higher than that of a low-voltage battery for starting-up the engine is mounted, and a direct current supplied from the high-voltage battery is inverted to an alternating current by an inverter and then is supplied to the electric motor.

In regard to a vehicle in which the high-voltage battery is mounted, it is preferable that a flow of current between the inverter and the high-voltage battery is blocked in advance in order to allow maintenance to be performed safely. Therefore, there is disclosed a power supply circuit in which a service plug (blocking member), which is manually detachable, is interposed between the inverter and the high-voltage battery, and the service plug is detached by a worker at the time of the maintenance to block the flow of current between the inverter and the high-voltage battery (for example, PTL 1).

FIG. 2 shows an example of the above-described power supply circuit. As shown in the same figure, the power supply circuit 100 includes a battery pack 101 disposed at the rear of the vehicle, an inverter 102 and a motor 103 that are disposed at the front of the vehicle as a load, an ECU 104 that is disposed at the front of the vehicle as a relay control unit that controls an operation of the inverter 102 and the motor 103. A high-voltage battery 105 is built in the battery pack 101, and a direct current supplied from the high-voltage-battery 105 is converted to an alternating current power source by the inverter 102 and is supplied to the motor 103.

In addition, three relays 106 provided between the high-voltage battery 105 and the inverter 102 are built in the battery pack 101. Both ends of a relay coil C provided to each of the relays 106 are connected to the ECU 104. The ECU 104 controls the current passing through the relay coil C and thereby controls the turning on and off of a contact point S of each of the relays 106.

The high-voltage battery 105 is an assembled battery in which batteries of a plurality of batteries are connected to each other in series, and a service plug 107 is provided between the batteries. The service plug 107 is detachably provided between the batteries making up the high-voltage battery 105. When the service plug is detached, a supply of power from the high-voltage battery 105 to the inverter 102 and the motor 103 is blocked and when the service plug is attached, the supply of power from the high-voltage battery 105 to the inverter 102 and the motor 103 is enabled. The service plug 107 is provided with an interlock switch 108 that detects the attachment and detachment of the service plug 107.

The interlock switch 108 is turned off when the service plug 107 is detached, and is turned on when the service plug 107 is attached. The ECU 104 is connected to the interlock switch 108 with the inverter 102 and the motor 103 interposed therebetween, determines that the service plug 107 is detached when the interlock switch 108 is turned off, and blocks the current flowing through the relay coil C and turns off the relay 106. Therefore, it is possible to more reliably block the supply of power from the high-voltage battery 105 to the inverter 102 and the motor 103.

CITATION LIST

Patent Literature

[PTL 1] JP-A-2005-142107

SUMMARY OF INVENTION

Technical Problem

However, according to the above-described power supply circuit 100, it is necessary to provide two electric wires L2 connecting the ECU 104 provided at the front of the vehicle and the interlock switch 108 provided at the rear of the vehicle to each other, in addition to an electric wire L1 connecting the ECU 104 provided at the front of the vehicle and the relay coil C of the relay 106 provided at the rear of the vehicle, accordingly, the number of long electric wires close to the total length of the vehicle becomes large, resulting in problems of cost.

Therefore, an object of the invention is to provide a power supply circuit in which the number of electric wires is reduced and thereby cost reduction is realized.

Solution to Problem

The invention for solving the above-described problems provides a power supply circuit: including a battery; a load to which power is supplied from the battery; a relay that is provided between the battery and the load; a relay control unit to which both ends of a relay coil provided in the relay are connected, and that controls current flowing through the relay coil by controlling a turning on and off of the relay; a blocking member that is detachably provided on a power supply path from the battery to the load, wherein when the blocking member is detached, the supply of power from the battery to the load is blocked and when the blocking member is attached, the supply of power from the battery to the load is enabled; and an interlock switch that is turned off when the blocking member is detached and is turned on when the blocking member is attached, wherein the interlock switch is connected between the relay control unit and the relay coil.

In addition, in the power supply circuit of the invention, a plurality of the relays are provided, other ends of relay coils provided in the plurality of relays are collectively connected to each other and are connected to one ground terminal provided on the relay control unit, and the interlock switch is connected between the ground terminal of the relay control unit and a downstream side in relation to a connection point at which the other ends of the relay coils are collectively connected.

Advantageous Effects of Invention

According to the invention described above, the interlock switch is connected between the relay control unit and the relay coils, such that when the interlock switch is turned off, the flow of current to the relay coils is blocked and thereby the relays are turned off. Therefore, two electric wires connecting the relay control unit and the interlock switch can be detached while allowing the relays to be turned off when the interlock switch is turned off, whereby cost reduction can be realized.

In addition, according to the invention, the interlock switch is connected between the ground terminal of the relay control unit and the downstream side in relation to the connection point at which the other ends of the relay coils are collectively connected, such that the plurality of relays can be turned off by the single interlock switch and thereby it is not necessary to provide the interlock switch for every relay, accordingly, cost reduction can be realized.

DESCRIPTION OF EMBODIMENTS

Figure 1:
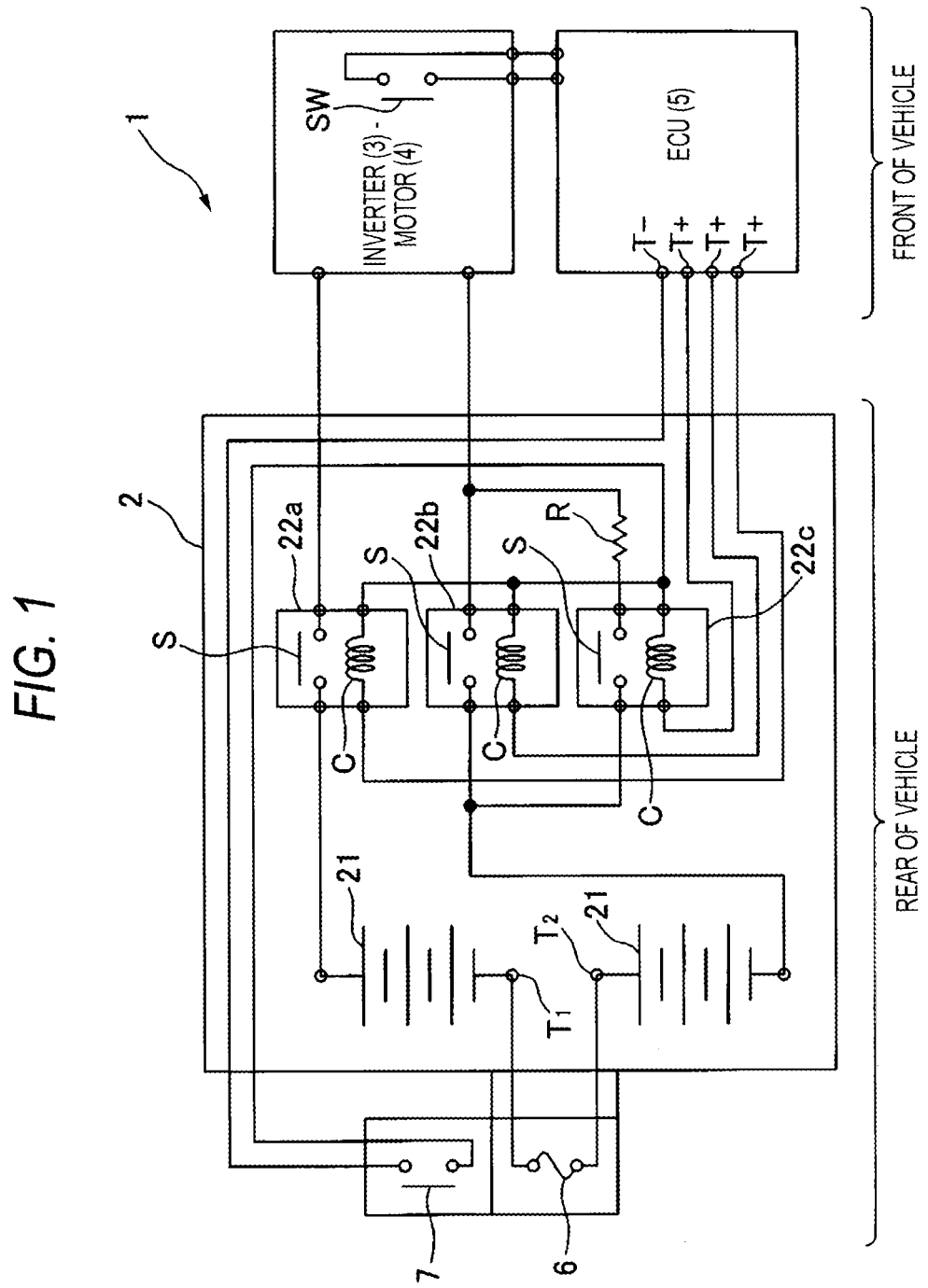
FIG. 1 is a circuit diagram illustrating a power supply circuit according to an embodiment of the invention.

Hereinafter, an embodiment of the invention will be described on the basis of FIG. 1. As shown in FIG. 1, the power supply circuit 1 includes a battery pack 2 disposed at the rear of a vehicle, an inverter 3 and a motor 4, which are disposed at the front of the vehicle, as a load, an ECU 5, which is disposed at the front of the vehicle, as a relay control unit, a service plug 6 as a blocking member, and an interlock switch 7. A high-voltage battery 21 as a battery, and three relays 22a to 22c provided at both ends of the high-voltage battery 21 are built in the battery pack 2.

The high-voltage battery 21 has a high voltage by connecting, for example, six batteries in series. Contact points S of the relays 22a and 22b are connected between both ends of the high-voltage battery 21 and the inverter 3, respectively. A contact point S of the relay 22c and a current restriction resistor R for restricting a rush current are connected in parallel with the relay 22b. The relay 22b is connected to a negative side of the high-voltage battery 21.

The turning on and off of the above-described relays 22a to 22c is controlled by the ECU 5. The ECU 5 turns on the relays 22a to 22c according to a turning on of the ignition switch, for example, and begins to start the supply of power to the inverter 3 and the motor 4 from the high-current battery 21. At this time, the ECU 5, first, turns on the relays 22a and 22c and supplies power via the current restriction resistor R, and then turns on the relay 22b. Due to the current restriction resistor R, the rush current flowing from the high-voltage battery 21 to the inverter 3 is restricted.

The inverter 3 is provided at a downstream side of the relays 22a to 22c, is operated by the supply of power from the high-voltage battery 21, and converts a direct current from the high-voltage battery 21 to an alternating current. The motor 4 is provided at a downstream side of the inverter 3 and is operated by the supply of power from the high-voltage battery 21, which is converted to the alternating current by the inverter 3.

Both ends of each of the relay coils C provided in the relays 22a to 22c are connected to the ECU 5, and the ECU 5 controls the current flowing through the relay coils C and thereby controls the turning on and off of the relays 22a to 22c. In other words, the ECU 5 includes the same number of signal terminals $T_+$ as the number of the relays 22a to 22c, to which one end of each of the three relay coils C is connected, respectively, and a ground terminal $T_-$ to which other ends of the relay coils C are collectively connected. The ground terminal $T_-$ is grounded. The ECU 5 controls an output of each of the signal terminals $T_+$ and thereby controls the current flowing through the relay coils C. In addition, the ECU 5 is connected to a power switch SW that is built in the inverter 3 or motor 4 and thereby controls the turning on and off of the power switch SW.

The service plug 6 is formed of a fusible conductive member that is melted down when an overcurrent flows therethrough. The service plug 6 is provided such that it can be manually attached to and detached from mounting terminals T1 and T2, which are provided between batteries making up the high-voltage battery 21. When the service plug 6 is detached, the supply of power from the high-voltage battery 21 to the inverter 3 and the motor 4 is blocked (shut off) and when the service plug 6 is attached, the supply of power from the high-voltage battery 21 to the inverter 3 and the motor 4 is enabled. The service plug 6 is provided with an interlock switch 7 that detects the attachment and detachment of the service plug 6.

The interlock switch 7 is turned off when the service plug 6 is detached and is turned on when the service plug 6 is attached. In addition, the interlock switch 7 is connected between the ground terminal $T_-$ and a downstream in relation to the connection point at which the other ends of the relay coils C are collectively connected.

According to the power supply circuit 1 with the above-described configuration, when the service plug 6 is attached, if the relays 22a to 22c are turned on, a power supply path from the high-voltage battery 21 to the inverter 3 and the motor 4 is closed and thereby the supply of power from the high-voltage battery 21 to the inverter 3 and the motor 4 is enabled according to the turning on of the relays 22a to 22c. On the other hand, when the service plug 6 is detached from the high-voltage battery 21 by a worker at the time of maintenance, the power supply path from the high-voltage battery 21 to the inverter 3 and the motor 4 is opened and thereby the supply of power from the high-voltage battery 21 to the inverter 3 and the motor 4 is blocked.

Figure 2:
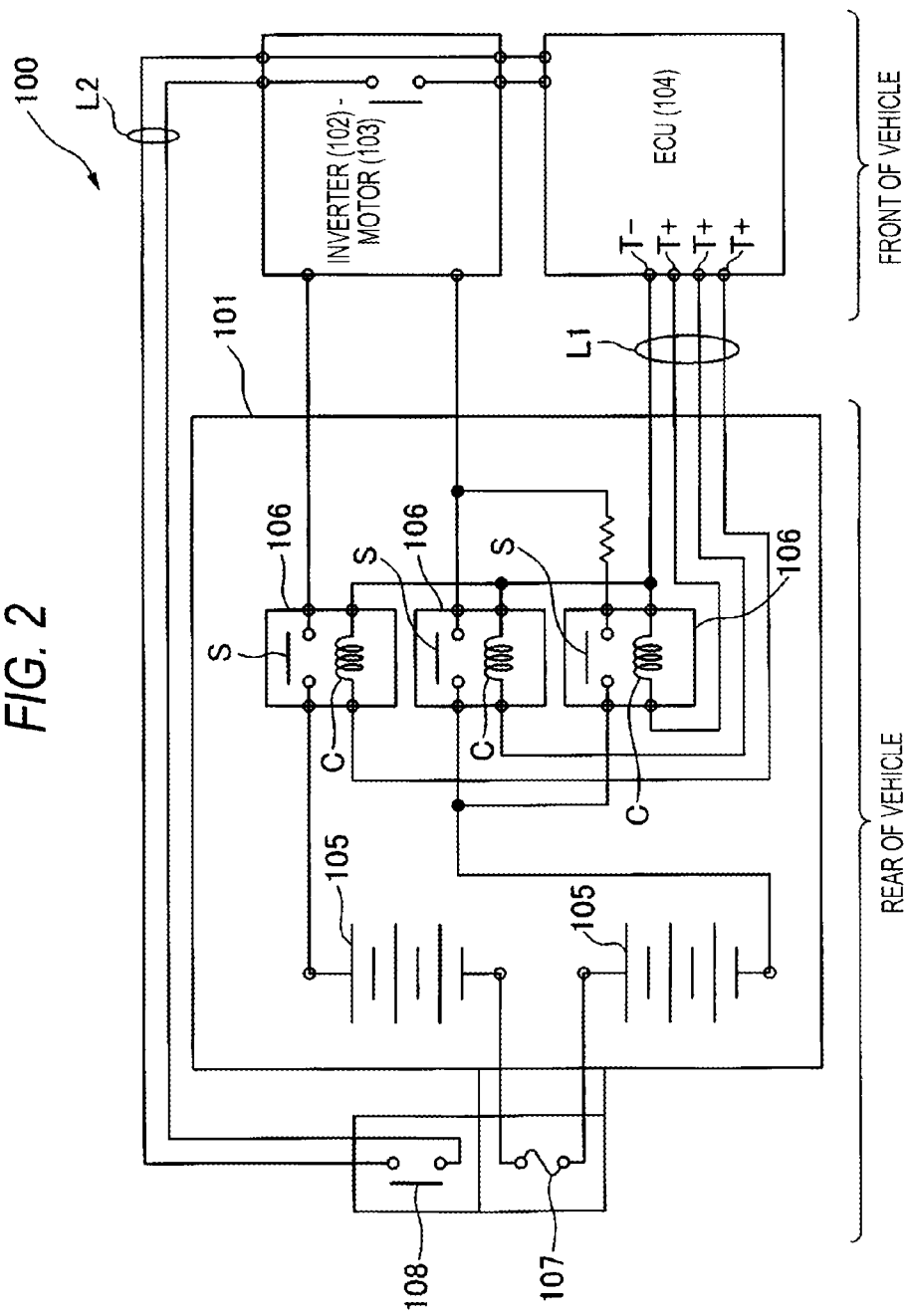
FIG. 2 is a circuit diagram illustrating a power supply circuit according to an example of the related art.

When the service plug 6 is detached from the high-voltage battery 21 and thereby the interlock switch 7 is turned off, the flow of current from the ECU 5 with respect to the relay coils C is blocked, accordingly, the relays 22a to 22c are turned off. Therefore, two electric wires L2 (FIG. 2) connecting the ECU 5 and the interlock switch 7 can be reduced while allowing the relays 22a to 22c to be turned off when the interlock switch 7 is turned off, whereby cost reduction can be realized.

In addition, according to the above-described power supply circuit 1, the interlock switch 7 is connected between the ground terminal $T_-$ of the ECU 5 and the downstream side in relation to the connection point at which the other ends of the relay coils C are collectively connected, such that the plurality of relays 22a to 22c can be turned off by the single interlock switch 7 and thereby it is not necessary to provide the interlock switch 7 for every relay 22a to 22c, accordingly, cost reduction can be realized.

In addition, according to the above-described embodiment, the service plug 6 is detachably provided between the batteries making up the high-voltage battery 21, but the invention is not limited thereto. The service plug 6 may be detachably provided on the power supply path from the high-voltage battery 21 to the inverter 3 that is a load.

In addition, according to the above-described embodiment, the interlock switch 7 is connected between the ground terminal $T_-$ of the ECU 5 and the downstream side in relation to the connection point at which the other ends of the relay coils C are collectively connected, but the invention is not limited thereto. If there are no problems in terms of cost, interlock switches 7 may be provided separately between one end of each of the relay coils 7 and the signal terminal $T_+$, respectively.

In addition, the above-described embodiment merely represents a representative embodiment of the invention, and the invention is not limited by the above-described embodiment.

That is to say, the invention may be implemented by various modifications made without departing from the scope of the invention.

The invention is described in detail with reference to a specific embodiment, but it should be understood by those skilled in the art that various modifications and alterations may be made without departing from the spirit and the scope of the invention.

The invention is based on Japanese Patent Application (2009-245353) filed on Oct. 26, 2009, and the disclosure of which is incorporated herein by reference.

REFERENCE SIGNS LIST

3: INVERTER (LOAD)
4: MOTOR (LOAD)
5: ECU (RELAY CONTROL UNIT)
6: SERVICE PLUG (BLOCKING MEMBER)
7: INTERLOCK SWITCH
21: HIGH VOLTAGE BATTERY (BATTERY)
22a to 22c: RELAY
c: RELAY COIL

The invention claimed is:

1. A power supply circuit, comprising:
a battery;
a load to which power is supplied from the battery;
a relay that is provided between the battery and the load;
a relay control unit to which both ends of a relay coil provided in the relay are connected, and that controls current flowing through the relay coil by controlling a turning on and off of the relay;
a blocking member that is detachably provided on a power supply path from the battery to the load, wherein in response to the blocking member being detached, the supply of power from the battery to the load is blocked, and in response to the blocking member being attached, the supply of power from the battery to the load is enabled; and
an interlock switch that is turned off when the blocking member is detached and is turned on when the blocking member is attached,
wherein the interlock switch is connected between the relay control unit and the relay coil.

2. The power supply circuit according to claim 1, wherein a plurality of the relays are provided,
wherein other ends of relay coils provided in the plurality of relays are collectively connected to each other and are connected to one ground terminal provided on the relay control unit; and
wherein the interlock switch is connected between the ground terminal of the relay control unit and a downstream side in relation to a connection point at which the other ends of the relay coils are collectively connected.

* * * * *